United States Patent
Takeuchi et al.

(10) Patent No.: US 10,867,488 B2
(45) Date of Patent: Dec. 15, 2020

(54) TERMINAL APPARATUS, SERVER, AND INFORMATION PROCESSING SYSTEM

(71) Applicants: SONY CORPORATION, Tokyo (JP); SONY MOBILE COMMUNICATIONS INC., Tokyo (JP)

(72) Inventors: Ryosuke Takeuchi, Saitama (JP); Seiji Muramatsu, Saitama (JP); Mioko Ambe, Tokyo (JP); Kazutoshi Ohno, Kanagawa (JP); Tetsuya Takahashi, Kanagawa (JP); Tetsuya Naruse, Kanagawa (JP); Mikio Takenaka, Kanagawa (JP); Ryo Yokoyama, Tokyo (JP); Akira Ono, Kanagawa (JP); Ryosuke Murakami, Tokyo (JP); Hideaki Hayashi, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/329,989

(22) PCT Filed: Jul. 20, 2017

(86) PCT No.: PCT/JP2017/026175
§ 371 (c)(1),
(2) Date: Mar. 1, 2019

(87) PCT Pub. No.: WO2018/047475
PCT Pub. Date: Mar. 15, 2018

(65) Prior Publication Data
US 2019/0206203 A1 Jul. 4, 2019

(30) Foreign Application Priority Data
Sep. 9, 2016 (JP) .................................. 2016-176257

(51) Int. Cl.
*G08B 6/00* (2006.01)
*H04M 3/42* (2006.01)
(Continued)

(52) U.S. Cl.
CPC ................. *G08B 6/00* (2013.01); *G06F 3/01* (2013.01); *H04M 1/72519* (2013.01); *H04M 3/42* (2013.01)

(58) Field of Classification Search
CPC .. G06F 3/01; G08B 6/00; H04M 3/42; H04M 1/72519
See application file for complete search history.

(56) References Cited

U.S. PATENT DOCUMENTS

| | | | | |
|---|---|---|---|---|
| 4,584,922 A | * | 4/1986 | Kamiya | ................... G10H 1/08 704/258 |
| 6,522,417 B1 | * | 2/2003 | Kakigahara | ........... G06F 1/1626 358/1.15 |

(Continued)

FOREIGN PATENT DOCUMENTS

| | | |
|---|---|---|
| JP | H11-015600 A | 1/1999 |
| JP | 2006-163579 A | 6/2006 |
| JP | 2009-239773 A | 10/2009 |

OTHER PUBLICATIONS

International Search Report and Written Opinion issued in connection with International Patent Application No. PCT/JP2017/026175, dated Sep. 5, 2017. (10 pages).

*Primary Examiner* — Hoi C Lau
(74) *Attorney, Agent, or Firm* — K&L Gates LLP

(57) ABSTRACT

[Solving Means] A terminal apparatus includes a processor part, a haptic-feedback-information output part, and a detection part. The processor part is configured to generate segmented-waveshape data by segmenting oscillation-waveshape data at a timing based on one or a plurality of periods of the oscillation-waveshape data, and to generate (Continued)

waveshape data based on the segmented-waveshape data. The haptic-feedback-information output part is configured to generate and output haptic-feedback information corresponding to the waveshape data generated by the processor part. The detection part is configured to detect an input signal based on a user action, and to output the detected input signal to the processor part as the oscillation-waveshape data.

9 Claims, 11 Drawing Sheets

(51) Int. Cl.
  *G06F 3/01* (2006.01)
  *H04M 1/725* (2006.01)

(56) References Cited

U.S. PATENT DOCUMENTS

| | | | | |
|---|---|---|---|---|
| 9,564,029 | B2* | 2/2017 | Morrell | H04L 12/1895 |
| 9,830,782 | B2* | 11/2017 | Morrell | H04L 12/1895 |
| 10,490,035 | B2* | 11/2019 | Morrell | G08B 6/00 |
| 2009/0156948 | A1* | 6/2009 | Shimizu | A61B 5/7207 |
| | | | | 600/509 |
| 2009/0247216 | A1 | 10/2009 | Kamatani et al. | |
| 2015/0116205 | A1* | 4/2015 | Westerman | G06F 3/0414 |
| | | | | 345/156 |
| 2016/0063826 | A1* | 3/2016 | Morrell | H04L 12/1895 |
| | | | | 340/407.1 |
| 2016/0163165 | A1* | 6/2016 | Morrell | H04M 19/047 |
| | | | | 340/407.1 |
| 2019/0206203 | A1* | 7/2019 | Takeuchi | H04M 1/72519 |

* cited by examiner

TERMINAL APPARATUS, SERVER, AND INFORMATION PROCESSING SYSTEM

CROSS-REFERENCE TO RELATED APPLICATIONS

The present application claims the benefit of International Application No. PCT/JP2017/026175, filed Jul. 20, 2017, which claims priority to Japanese Application No. 2016-176257, filed Sep. 9, 2016, the disclosures of which are incorporated herein by reference.

BACKGROUND

The present technology relates to a technology of information processing using a haptic-feedback presenting device.

BACKGROUND ART

An information processing system according to Patent Literature 1 provides information of a haptic feedback corresponding to an image, in addition to vision information that a user sees the image. Specifically, an information processing apparatus in the information processing system transmits haptic-feedback information for haptic-feedback presentation corresponding to image information including a moving image or a still image to a reception-side apparatus. The haptic-feedback information is segmented-waveshape data of an oscillation. The reception-side apparatus receives the haptic-feedback information, and presents the image and, for example, the haptic feedback to the user by using a haptic-feedback producing means such as a piezoelectric sensor. Such an information processing system is applied to, for example, a haptic-feedback videophone system, an emotional-haptic-feedback telephone system, a haptic-feedback Internet shopping system, and a game distribution system having a haptic-feedback function (Refer to paragraphs [0026], [0027], [0031], and the like of the specification of Patent Literature 2, for example.).

SUMMARY

Technical Problem

As described above, various apparatuses and services using a haptic-feedback presenting technology are expected, and a new system for improving interest of a user is desirable.

It is an object of the present disclosure to provide an information processing system using the haptic-feedback presenting technology to improve interest of a user, and a terminal apparatus and a server included in the information processing system.

Solution to Problem

In order to attain the above-mentioned object, a terminal apparatus according to the present technology includes a processor part, a haptic-feedback-information output part, and a detection part.

The processor part is configured to generate segmented-waveshape data by segmenting oscillation-waveshape data at a timing based on one or a plurality of periods of the oscillation-waveshape data, and to generate waveshape data based on the segmented-waveshape data.

The haptic-feedback-information output part is configured to generate and output haptic-feedback information corresponding to the waveshape data generated by the processor part.

The detection part is configured to detect an input signal based on a user action, and to output the detected input signal to the processor part as the oscillation-waveshape data.

The terminal apparatus generates the waveshape data based on the segmented-waveshape data generated by segmenting the oscillation-waveshape data at the timing based on the one or plurality of periods. Due to this, the terminal apparatus may generate the haptic-feedback information corresponding to or based on the oscillation-waveshape data by the haptic-feedback-information output part, and may reproduce a haptic feedback anytime. Moreover, the terminal apparatus may process the oscillation-waveshape data corresponding to the user action by a user input to the terminal apparatus. Therefore, the terminal apparatus may achieve an improvement in interest of the user.

The processor part may be configured to generate superimposed-waveshape data by superimposing the plurality of segmented-waveshape data of the oscillation-waveshape data corresponding to the input signal detected by the detection part on each other.

The haptic-feedback-information output part may be configured to generate and output haptic-feedback information corresponding to the superimposed-waveshape data.

The terminal apparatus may further include a communication part configured to transmit and receive the oscillation-waveshape data or the segmented-waveshape data. Due to this, the waveshape data may be transmitted and received between the terminal apparatus and an external apparatus.

The processor part may be configured to generate superimposed-waveshape data by superimposing segmented-waveshape data of first oscillation-waveshape data corresponding to the input signal detected by the detection part and segmented-waveshape data of second oscillation-waveshape data acquired via the communication part on each other.

The haptic-feedback-information output part may be configured to generate and output haptic-feedback information corresponding to the superimposed-waveshape data.

Due to this, a haptic feedback corresponding to the superimposed-waveshape data generated by superimposing the first oscillation-waveshape data based on the user action by the user and the other second oscillation-waveshape data on each other may be presented to the user. Therefore, the user may obtain a sense of unity with a haptic feedback by the second oscillation-waveshape data, or a shared sense and a sense of unity with the other user generating the second oscillation-waveshape data, for example.

The "segmented-waveshape data of the second oscillation-waveshape data acquired via the communication part" includes two meanings described below. The communication part may acquire the segmented-waveshape data generated on the basis of the second oscillation-waveshape data. Alternatively, the communication part may acquire the second oscillation-waveshape data, and the processor part may generate the segmented-waveshape data by segmenting the second oscillation data. Hereinafter, the same applies.

The processor part may be configured to generate superimposed-waveshape data by superimposing segmented-waveshape data of second oscillation-waveshape data transmitted from another second terminal apparatus and acquired via the communication part, and segmented-waveshape data of the oscillation-waveshape data on each other.

Due to this, a haptic feedback corresponding to the superimposed-waveshape data generated by superimposing the first oscillation-waveshape data based on the user action by the user and the second oscillation-waveshape data from the second terminal apparatus on each other may be presented to the user. Therefore, the user may obtain a sense of unity with a haptic feedback by the second oscillation-waveshape data, or a shared sense and a sense of unity with the other user generating the second oscillation-waveshape data, for example.

The detection part may have a sensing function for starting generation of the haptic-feedback information by the haptic-feedback-information output part.

The processor part may be configured to execute the segmenting processing on the basis of a value detected by the sensing function.

The haptic-feedback-information output part may be configured to generate and output the haptic-feedback information based on the waveshape data.

Due to this, in a case that the terminal apparatus is in a predetermined state, a haptic feedback based on the superimposed-waveshape data may be presented to the user.

The processor part may include an application program for starting generation of the haptic-feedback information by the haptic-feedback-information output part, and may be configured to execute the application program to execute the segmenting processing.

The haptic-feedback-information output part may be configured to generate and output the haptic-feedback information based on the waveshape data.

Due to this, in a case that the user executes the application program, the haptic feedback based on the superimposed-waveshape data may be presented to the user.

A server according to an embodiment includes a communication part and a processor part.

The processor part is configured to generate segmented-waveshape data by segmenting oscillation-waveshape data received by the communication part at a timing based on one or a plurality of periods of the oscillation-waveshape data.

The processor part is configured to transmit the oscillation-waveshape data or the segmented-waveshape data to a first terminal apparatus via the communication part, according to a request for transmission from the first terminal apparatus received by the communication part.

In a case that the first terminal apparatus has a function of detecting an input signal based on a user action, and transmitting the detected input signal to the server as first oscillation-waveshape data, the processor part may be configured as described below. The processor part, that is, is configured to generate superimposed-waveshape data by superimposing segmented-waveshape data of second oscillation-waveshape data transmitted from another second terminal apparatus different from the first terminal apparatus, and segmented-waveshape data of the first oscillation-waveshape data on each other, and to transmit the superimposed-waveshape data to the first terminal apparatus.

The processor part may further be configured to transmit the superimposed-waveshape data to a second terminal apparatus, according to a request for transmission from the second terminal apparatus received by the communication part.

An information processing system according to an embodiment includes the server and the terminal apparatus.

Advantageous Effects of Invention

As described above, according to the present technology, interest of a user may be improved by using the haptic-feedback presenting technology.

Note that the effects described above are not limitative, but any effect described in the present disclosure may be produced.

DETAILED DESCRIPTION

Hereinafter, embodiments according to the present technology will be described with reference to the drawings.

1. Concept of the Present Technology

Figure 1:
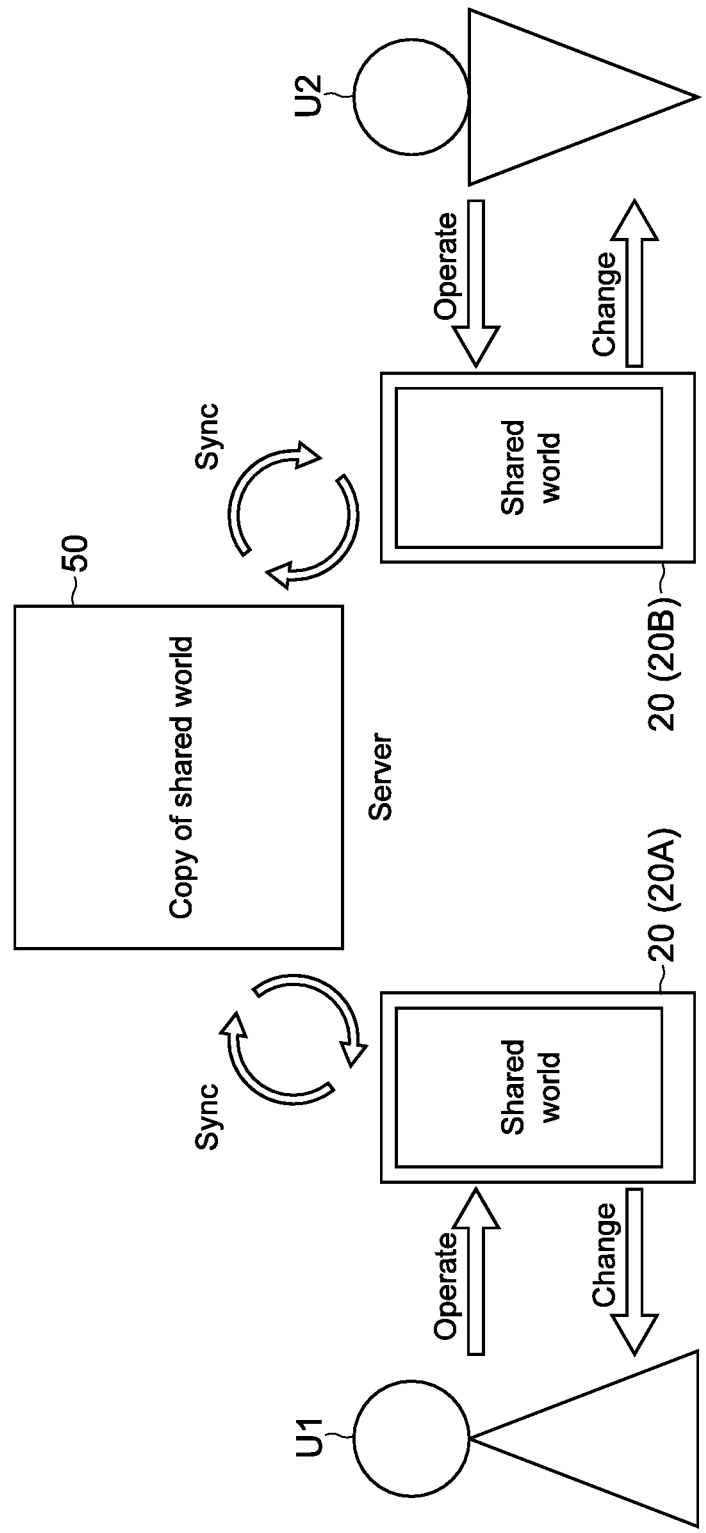
FIG. 1 is a system configuration diagram showing a concept of the present technology.

FIG. 1 shows a concept of the present technology. In the present technology, for example, a shared world that is a virtual world for a plurality of users (for example, U1 and U2) is realized by the users U1 and U2 using a terminal apparatus 20, respectively. The shared world is realized by a cloud including a server 50 and the like, for example. Each of the terminal apparatuses 20 copies the shared world, and presents the shared world to each of the users U1 and U2 as haptic-feedback (here, sense of force is assumed to mean haptic feedback) information.

Note that, as described below, the server 50 is not an essential component, and the shared world may be realized by the terminal apparatuses 20 that are connected to each other by peer-to-peer connection. Moreover, the number of the users (terminal apparatuses 20) is not necessarily limited to a plurality, and the range of the present technology includes an information processing system in which the one terminal apparatus 20 used by the one user is connected to the server 50. Alternatively, the range of the present technology also includes processing by the one terminal apparatus 20 that is not connected to the server 50.

2. Configuration of Information Processing System

Figure 2:
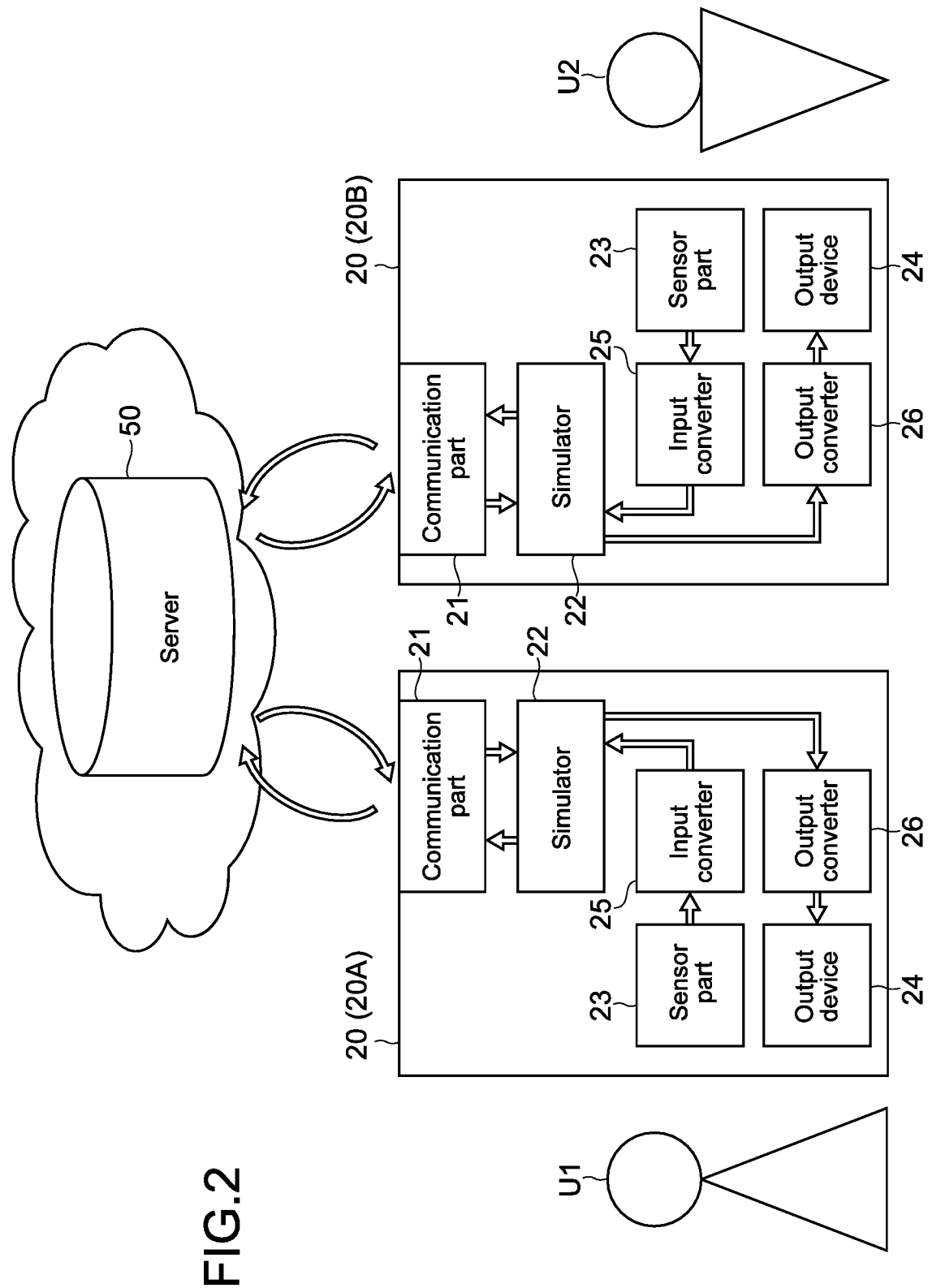
FIG. 2 is a block diagram showing a configuration of an information processing system according to an embodiment of the present technology.

FIG. 2 is a block diagram showing a configuration of an information processing system according to an embodiment of the present technology. The information processing system includes the server 50 in a cloud and the plurality of terminal apparatuses 20 connected to the server 50. As the terminal apparatus 20, various haptic-feedback presenting devices that are known to the public are usable.

Because a fundamental configuration of the terminal apparatus 20A used by the user U1 is the same as a fundamental configuration of the terminal apparatus 20B used by the user U2, the one terminal apparatus 20 will be described. Hereinafter, in a case that the terminal apparatuses 20A and 20B have to be distinguished, the terminal apparatus 20 used by the user U1 is referred to as the terminal apparatus 20A, and the terminal apparatus 20 used by the user U2 is referred to as the terminal apparatus 20B.

The terminal apparatus 20 includes a communication part 21, a simulator 22, a sensor part 23, an output device 24, an input converter 25, and an output converter 26.

Typically, the communication part 21 is a communication interface capable of being connected by IP (Internet Protocol).

The sensor part 23 detects an input signal to the terminal apparatus 20 based on a "user action" by the user. The user action is an input action by the user U1 to the terminal apparatus 20A for sharing a motion in which the user U1 holds and voluntarily moves the terminal apparatus 20A with (terminal apparatus 20B of) the user U2. Of course, the user action by the user U2 to the terminal apparatus 20B means the same.

The sensor part 23 includes various one or more kinds of sensors. Examples of the sensor include, for example, a motion sensor (at least one of gyrosensor, acceleration sensor, or geomagnetic sensor), a pressure-sensitive sensor, a touch sensor, or the like.

The input converter 25 is an A/D converter that converts an analog signal detected by the sensor part 23 to a digital signal.

The sensor part 23, or the sensor part 23 and the input converter 25 function as a "detection part".

The output device 24 is a device configured to produce a partial acceleration in at least one axis direction of one to three axis directions that are orthogonal to each other. Due to this, the output device 24 presents haptic-feedback information to the user. Typically, the output device 24 includes, although not shown, an actuator and a weight driven by the actuator. As the output device 24, for example, an actuator of the haptic-feedback presenting device that is disclosed in International Patent Application No. 2015/151380 applied by the present applicant is usable.

The output device 24 is not limited to a piezoelectric actuator, and examples of the output device 24 include a linear resonance actuator, a magnetostriction actuator, an electrostatic actuator, or the like.

The sensor part 23 has a sensing function for, at a preceding stage of the input signal to the terminal apparatus 20 based on the user action, starting generation of the haptic-feedback information or starting segmenting processing of oscillation-waveshape data as described below. Hereinafter, an input operation to the terminal apparatus 20 by the user that is a target of sensing is referred to as "user trigger action", and is conceptually distinguished from "user action".

Examples of the user trigger action include, for example, an action in which the user holds the terminal apparatus 20, makes the held terminal apparatus 20 in a predetermined attitude, grips the terminal apparatus 20 by predetermined force, presses a predetermined region of the terminal apparatus 20, or the like. A processor part of the terminal apparatus 20 described below is configured to execute the segmenting processing described below on the basis of a value detected by the sensor part 23 (for example, when detected value is more than threshold) and the oscillation-waveshape data.

Alternatively, the user trigger action may be executing an application program for generation of the haptic-feedback information or starting the segmenting processing without sensing of the sensor part 23 but by the output device 24.

The output converter 26 is a D/A converter that converts a digital signal from the simulator 22 to an analog signal.

The sensor part 23, or the sensor part 23 and the output converter 26 function as a "haptic-feedback-information output part".

The simulator 22 generates segmented-waveshape data by segmenting the oscillation-waveshape data at a timing based on one or a plurality of periods of the oscillation-waveshape data. Moreover, the simulator 22 may store the generated segmented-waveshape data in a storage part that is not shown. Moreover, the simulator 22 also has a function of generating waveshape data (for example, superimposed-waveshape data) based on the segmented-waveshape data as described below. In this case, the simulator functions as the "processor part" mainly.

The oscillation-waveshape data are data showing a motion of the terminal apparatus 20 by the user action detected by the sensor part 23. Moreover, the terminal apparatus 20 may acquire the oscillation-waveshape data, the segmented-waveshape data, or superimposed-waveshape data from the server 50. In other words, the terminal apparatus 20A may transmit the oscillation-waveshape data (first oscillation-waveshape data) based on the user action input by the user U1 to the terminal apparatus 20B via the server 50. Moreover, the terminal apparatus 20B may also transmit the oscillation-waveshape data (second oscillation-waveshape data) based on the user action input by the user U2 to the terminal apparatus 20A via the server 50.

As hardware, the terminal apparatus 20 includes a CPU (Central Processing Unit), a RAM (Random Access Memory), and a ROM (Read Only Memory) that are not shown. In addition to the CPU or instead of the CPU, a DSP (Digital Signal Processor) or a PLD (Programmable Logic Device) may be used. The storage part includes a rewritable ROM, a hard disc drive, and other memories.

Similarly, the server 50 also includes a CPU (server-side processor part), a RAM, a ROM, a communication interface (server-side communication part), and the like as hardware. Moreover, the server 50 includes a storage part that stores the oscillation-waveshape data transmitted from the terminal apparatus 20 and the generated segmented-waveshape data.

3. Operation Examples of Information Processing System 3. 1) Operation Example 1 (Example in which Segmented-Waveshape Data Based on Oscillation-Waveshape Data are not Generated)

In an operation example 1, an example in which the segmented-waveshape data of the oscillation-waveshape data and the waveshape data (for example, superimposed-waveshape data) based on the segmented-waveshape data are not generated will be described.

3. 1. 1) Operation Example 1-1

In an operation example 1-1, an example of a simultaneous operation is shown. In the simultaneous operation, the users have the terminal apparatuses 20 at the same time, and the one user inputs the user action, and the other user receives information corresponding to the user action. In the operation example 1, that is, an example in which the users share the haptic-feedback information with each other in real time will be described. Here, "at the same time" means a case that while the one user inputs the user action, the other user inputs the user trigger action (for example, lift up terminal apparatus 20). Hereinafter, the same applies.

Figure 3:
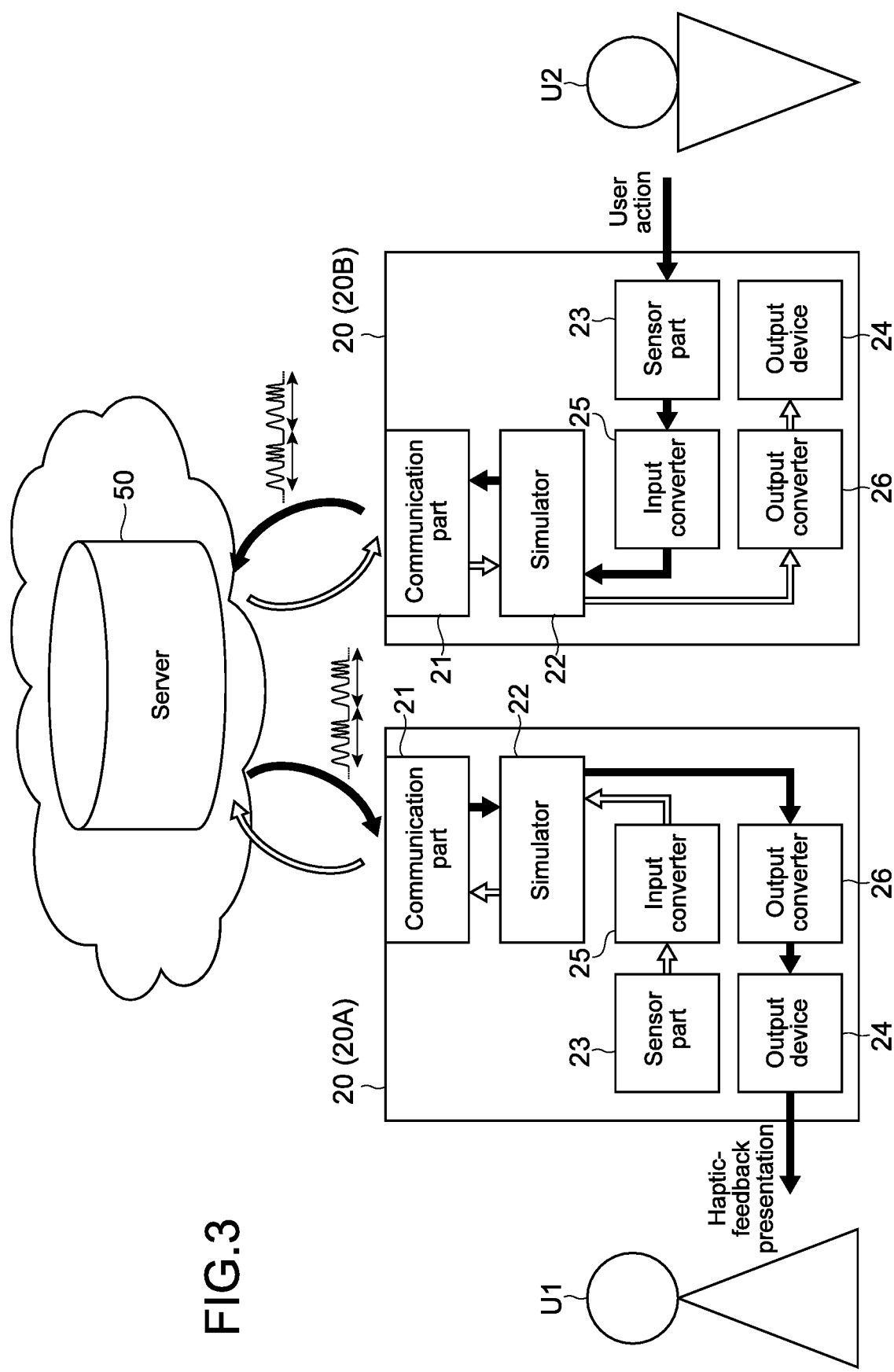
FIG. 3 is a diagram for illustrating an operation example 1-1 of the information processing system.
Figure 4:
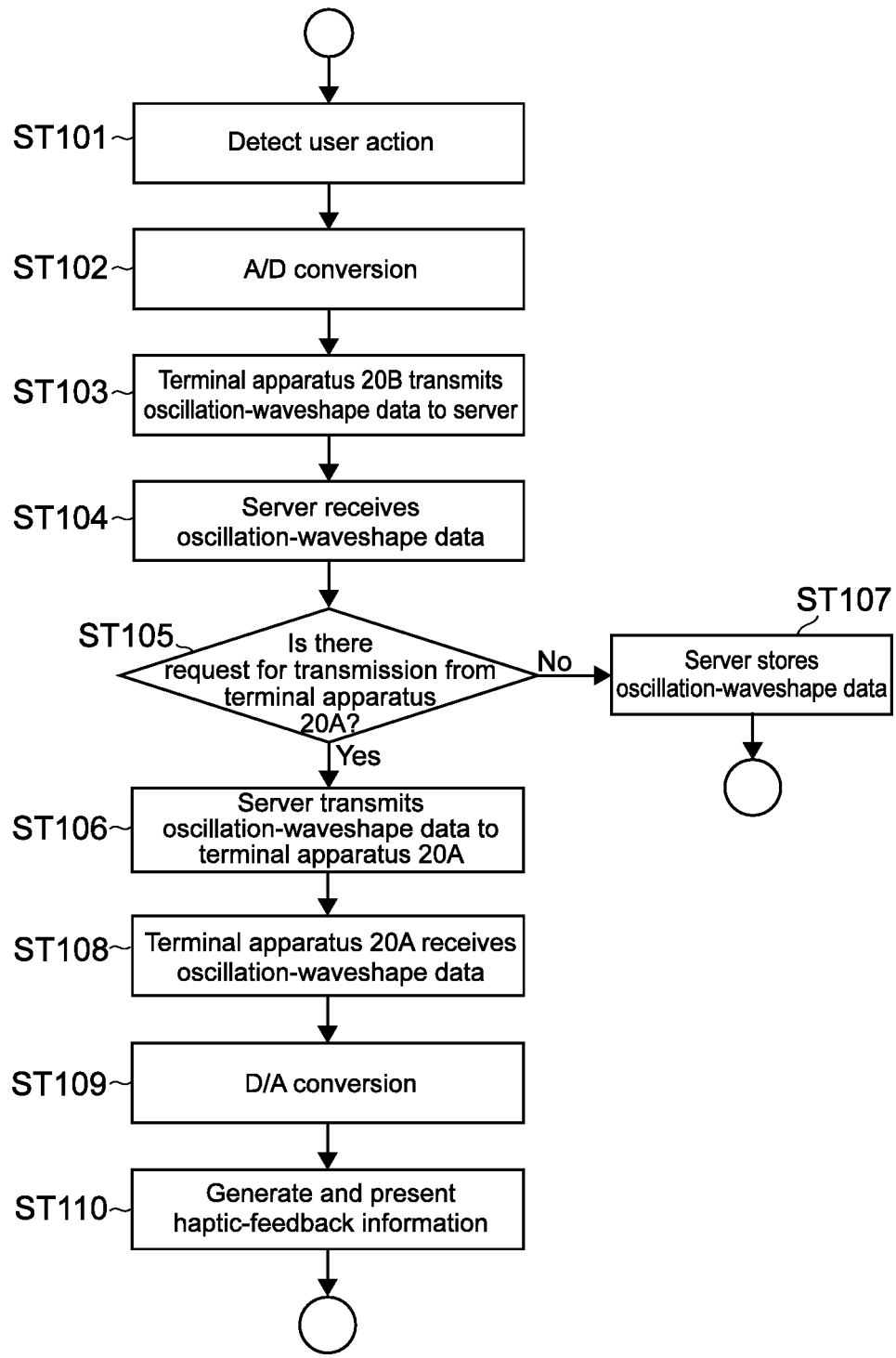
FIG. 4 is a flowchart showing the operation example 1-1 in which segmenting processing is not performed.

FIG. 3 is a diagram illustrating the operation example 1-1, and FIG. 4 is a flowchart showing the operation in the operation example 1-1.

Examples of the user action include, for example, gripping, shaking up and down, rapping, pressing, rotating, or rubbing the terminal apparatus 20, or a combination of at least two of these. For example, when the two users grip and shake the terminal apparatuses 20 up and down, the two users share the haptic feedback that the two users shake hands with each other.

The user U2 inputs the user action to the terminal apparatus 20B. The sensor part 23 of the terminal apparatus 20B detects the user action, and A/D conversion is executed (steps 101 and 102). Then, the simulator 22 of the terminal apparatus 20B acquires the oscillation-waveshape data of the user action, and transmits the oscillation waveshape to the server 50 via the communication part 21 (step 103). The server 50 receives the oscillation-waveshape data (step 104).

In this time, the server 50 detects whether or not a request for transmission of the oscillation-waveshape data from the terminal apparatus 20A of the user U1 is received (step 105). In other words, the server 50 detects, in real time, whether or not the user U1 uses the terminal apparatus 20A when the user action is input to the terminal apparatus 20B. Specifically, the user U1 inputs the user trigger action to the terminal apparatus 20A, and as a result, the terminal apparatus 20A transmits the request for transmission to the server 50.

When the server 50 receives the request for transmission, the server 50 transmits the oscillation waveshape that the server 50 receives from the terminal apparatus 20B to the terminal apparatus 20A in real time (step 106). In a case that the server 50 does not receive the request for transmission, the server 50 stores the oscillation-waveshape data (step 107). In this case, the server 50 may store the oscillation-waveshape data having a predetermined time length after the oscillation-waveshape data are received, or may store the oscillation-waveshape data having a predetermined data amount after the oscillation-waveshape data are received. Alternatively, the server 50 may generate the segmented-waveshape data described below from the oscillation-waveshape data, and may store the segmented-waveshape data.

The terminal apparatus 20A receives the oscillation-waveshape data transmitted from the server 50 (step 108), and the simulator 22 acquires the oscillation-waveshape data. The terminal apparatus 20A executes D/A conversion (step 109). The output device 24 generates the haptic-feedback information corresponding to the oscillation-waveshape data, and according to the haptic-feedback information, drives the actuator. Then, the output device 24 presents the haptic feedback to the user U1 (step 110).

According to the operation example 1, in this manner, the terminal apparatus 20A of the user U1 receives the information of the user action input by the user U2 to the terminal apparatus 20B in real time, and the haptic feedback is presented to the user U1. As a result, the user U1 may share the information of the user action by the user U2 with the user U2 by the haptic feedback in real time.

3. 1. 2) Operation Example 1-2

Figure 5:
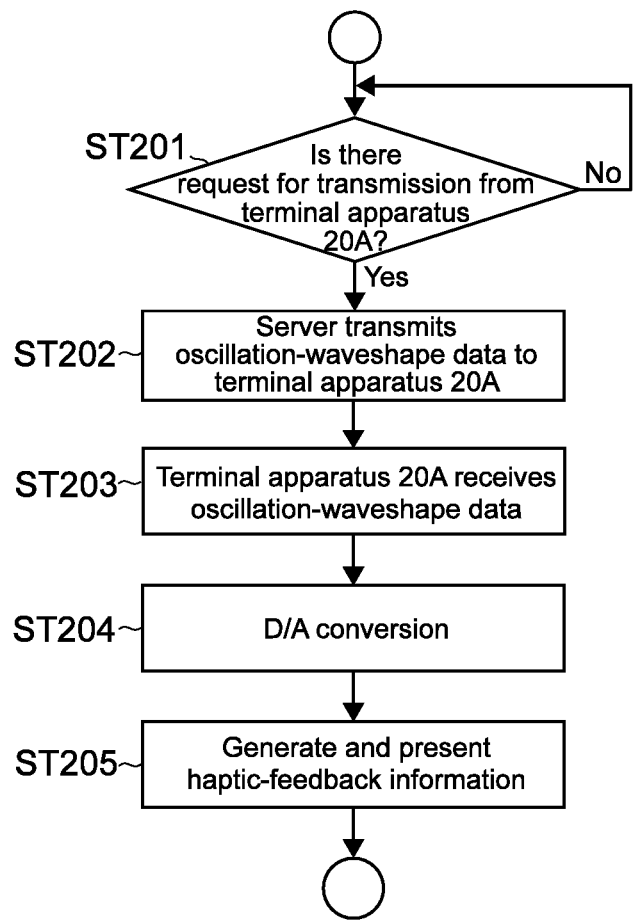
FIG. 5 is a flowchart showing an operation example 1-2 in which segmenting processing is not performed.

In an operation example 1-2, an example of a non-simultaneous operation is shown. In the non-simultaneous operation, although not in real time as shown in the operation example 1, the terminal apparatus 20 of the other user receives the information of the user action input by the one user to the terminal apparatus 20 after some time. FIG. 5 is a flowchart showing the operation in the operation example 1-2. The operation example 1-2 is the operation after the step 107 in the operation example 1-1. Hereinafter, descriptions of the similar portions to the operation example 1 will be omitted.

In the step 107, the server 50 stores the oscillation-waveshape data. The server 50 detects whether or not the request for transmission of the oscillation-waveshape data from the terminal apparatus 20B to the terminal apparatus 20A is received (step 201). In a case that the server 50 receives the request for transmission, processing after that is similar to the processing in the steps 106 to 110 (steps 202 to 205).

According to the operation example 1-2, although not in real time, the terminal apparatus 20A receives the oscillation-waveshape data from the terminal apparatus 20B stored in the server 50, and as a result, the haptic feedback may be presented to the user U1.

3. 2) Operation Example 2 (Example in which Segmenting Processing is Executed on Basis of Oscillation-Waveshape Data, and Waveshape Data are Generated)

In an operation example 2, an example in which the oscillation-waveshape data are segmented, and the superimposed-waveshape data (waveshape data) are generated will be described.

3. 2. 1) Operation Example 2-1

Figure 6:
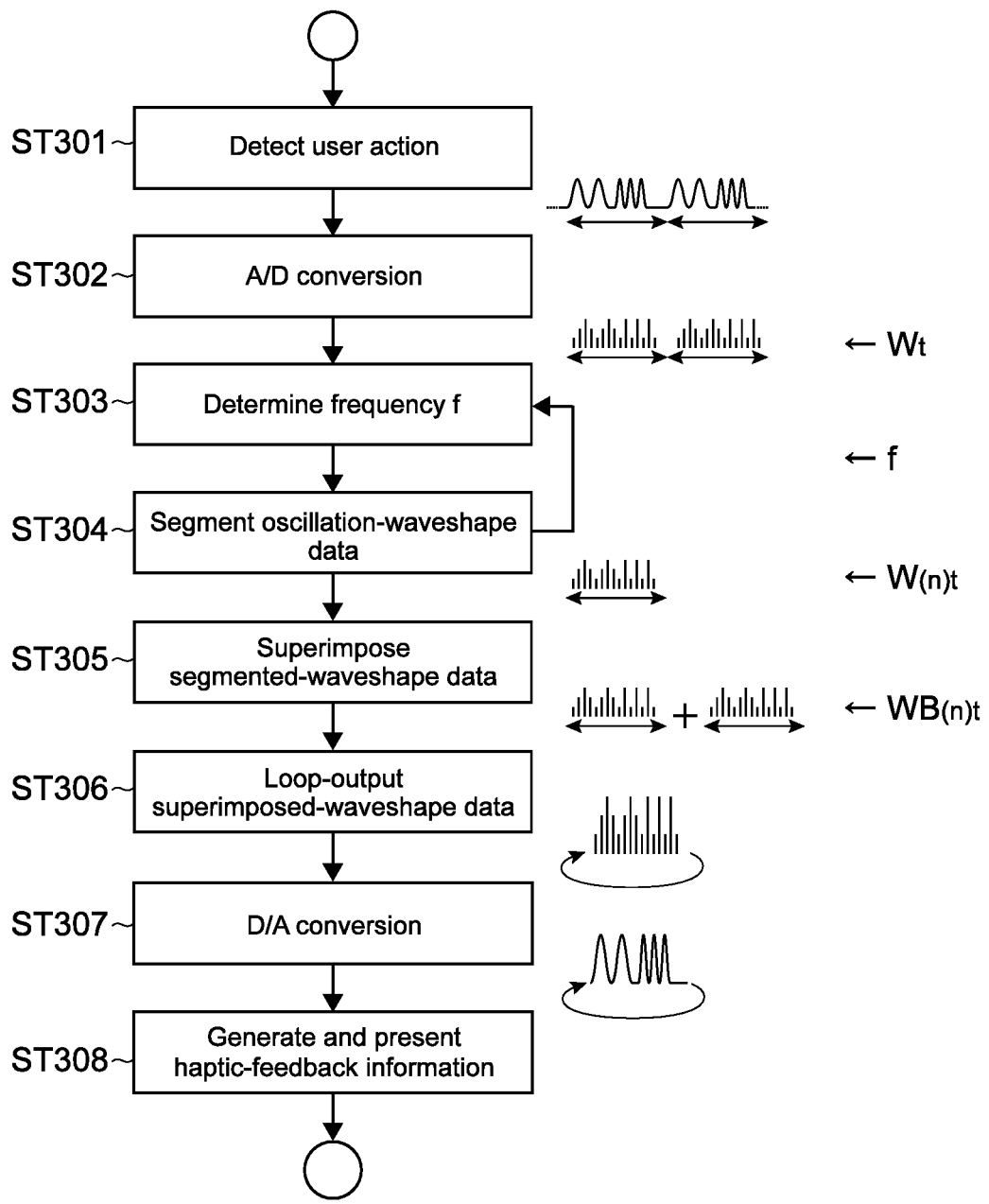
FIG. 6 is a flowchart showing an operation example 2-1 in which segmenting processing and superimposing processing are performed.

In an operation example 2-1, for example, an example in which the superimposed-waveshape data are generated by superimposing the oscillation-waveshape data based on the user action input by the one user and the oscillation-waveshape data that are obtained in a case that the user inputs the user action continuously after that on each other will be described. In the present operation example 2-1, the server 50 is unnecessary, and the present operation 2-1 is assumed to be processing in the terminal apparatus 20 and will be described. FIG. 6 is a flowchart showing the operation of the terminal apparatus 20.

Figure 7:
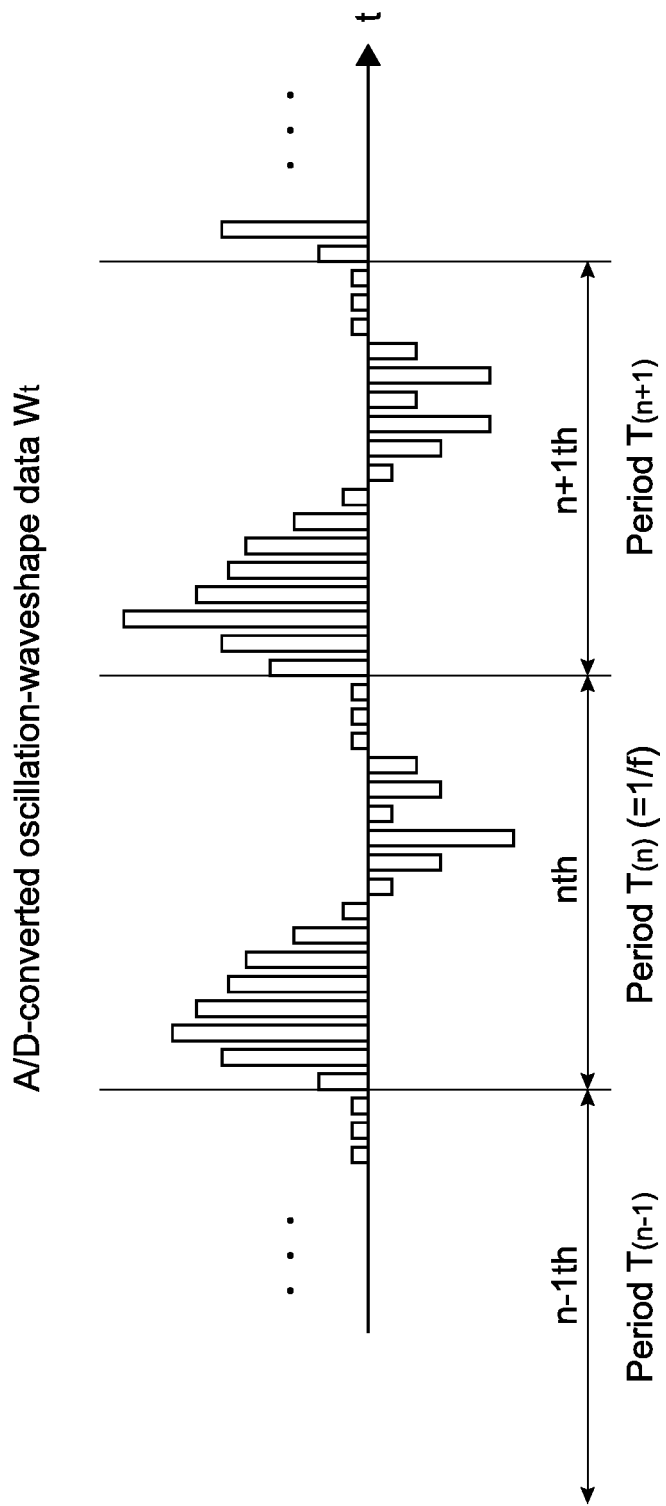
FIG. 7 shows an example of A/D-converted oscillation-waveshape data in the operation example 2-1.

The processing in the steps 301 and 302 is the same as the processing in the steps 101 and 102 in the operation example 1. FIG. 7 shows an example of the oscillation-waveshape data $W_t$ that are A/D-converted in the step 302. The simulator 22 of the terminal apparatus 20 determines a frequency f of the oscillation-waveshape data $W_t$ (step 303), and segments the received oscillation-waveshape data at timings based on a period T (=1/f) of the determined frequency f (step 304). Determination of the frequency is performed, for example, by Fourier transform or the like. As a result, the segmented-waveshape data are generated.

The segmented-waveshape data are expressed as $W_{(n)t}$. The period of the oscillation-waveshape data that is obtained first is expressed as $T_{(1)}$, . . . , the period of the oscillation-waveshape data that is obtained n−1th times is expressed as $T_{(n-1)}$, the period of the oscillation-waveshape data that is obtained nth times is expressed as $T_{(n)}$, the period of the oscillation-waveshape data that is obtained n+1th times is expressed as $T_{(n+1)}$, and similarly to the above. The segmented-waveshape data that are segmented every one period are ..., $W_{(n-2)t}$, $W_{(n-1)t}$, $W_{(n)t}$, $W_{(n+1)t}$, ..., respectively. Each of numbers in parentheses shows order (number of times) of the obtained period.

The one n−1th segmented-waveshape data $W_{(n-1)t}$ is expressed as the waveshape data segmented in the $T_{(n-1)}$−1 (timing that is end of period before one period from time point at which data of n−1th period is obtained). Similarly, the one nth segmented-waveshape data $W_{(n)t}$ is expressed as the waveshape data segmented in the $T_{(n)}$−1. Similarly, the one n+1th segmented-waveshape data $W_{(n+1)t}$ is expressed as the waveshape data segmented in the $T_{(n+1)}$−1.

The simulator 22 repeats the steps 303 and 304, and generates the segmented-waveshape data, the number of which is the number of the repeats of segmenting at the timings every one period as described above. The simulator 22 may store at least one of the segmented segmented-waveshape data in the storage part.

By an equation (1) described below, the simulator 22 acquires the superimposed-waveshape data $WB_{(n)t}$ by superimposing the segmented-waveshape data $W_{(n)t}$ that are generated repeatedly on each other in order respectively (step 305). In the equation (1), the superimposed-waveshape data are obtained by performing moving average processing ten times, for example.

$$WB_{(n)t}=WB_{(n-1)t}+(W_{(n)t}-W_{(n-10)t})/10 \quad (1)$$

An equation (2) described below expresses a period (loop period) $TT_{(n)}$ of the superimposed-waveshape data.

$$TT_{(n)}=TT_{(n-1)}+(T_{(n)}-T_{(n-10)})/10 \quad (2)$$

The simulator 22 loop-outputs the superimposed-waveshape data in the periods of t=0 to t=$TT_{(n)}$−1 (step 306).

The steps 307 and 308 are the same processing as the steps 109 and 110.

Due to this, when the user inputs the user action to the terminal apparatus 20 of the user continuously, the user action is amplified in real time, and the haptic feedback corresponding to the amplified oscillation-waveshape data may be presented to the user. As a result, it is possible to achieve an improvement in interest of the user.

Note that the upper limit value of an amplitude of the superimposed-waveshape data may be determined as a predetermined value. Moreover, in the descriptions, the sampling number of moving average processing is ten. Alternatively, the number may be more than or less than ten.

3. 2. 2) Operation Example 2-2

Figure 8:
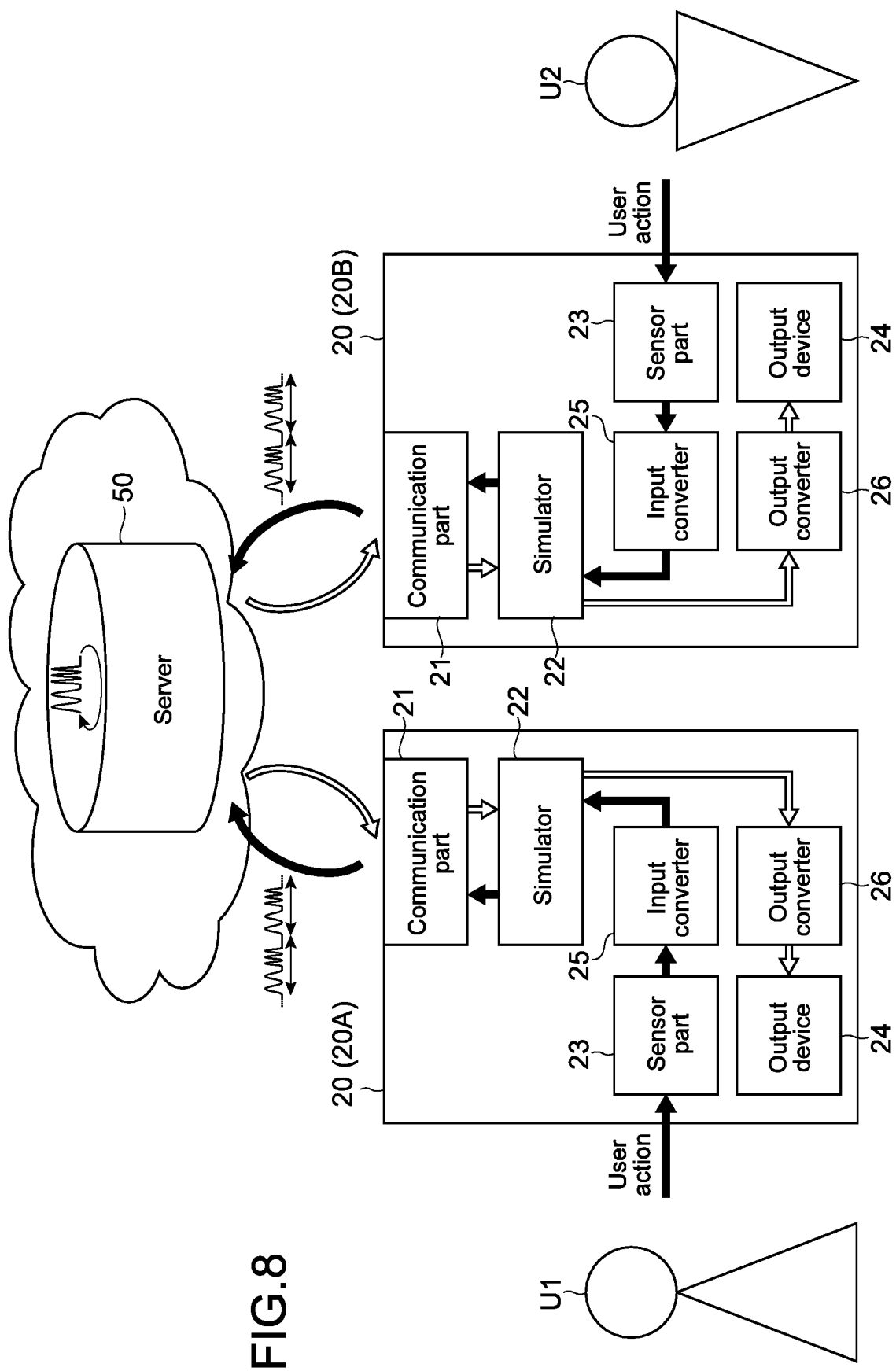
FIG. 8 is a diagram for illustrating an operation when data are uploaded to a server in an operation example 2-2 in which segmenting processing and superimposing processing are performed.
Figure 9:
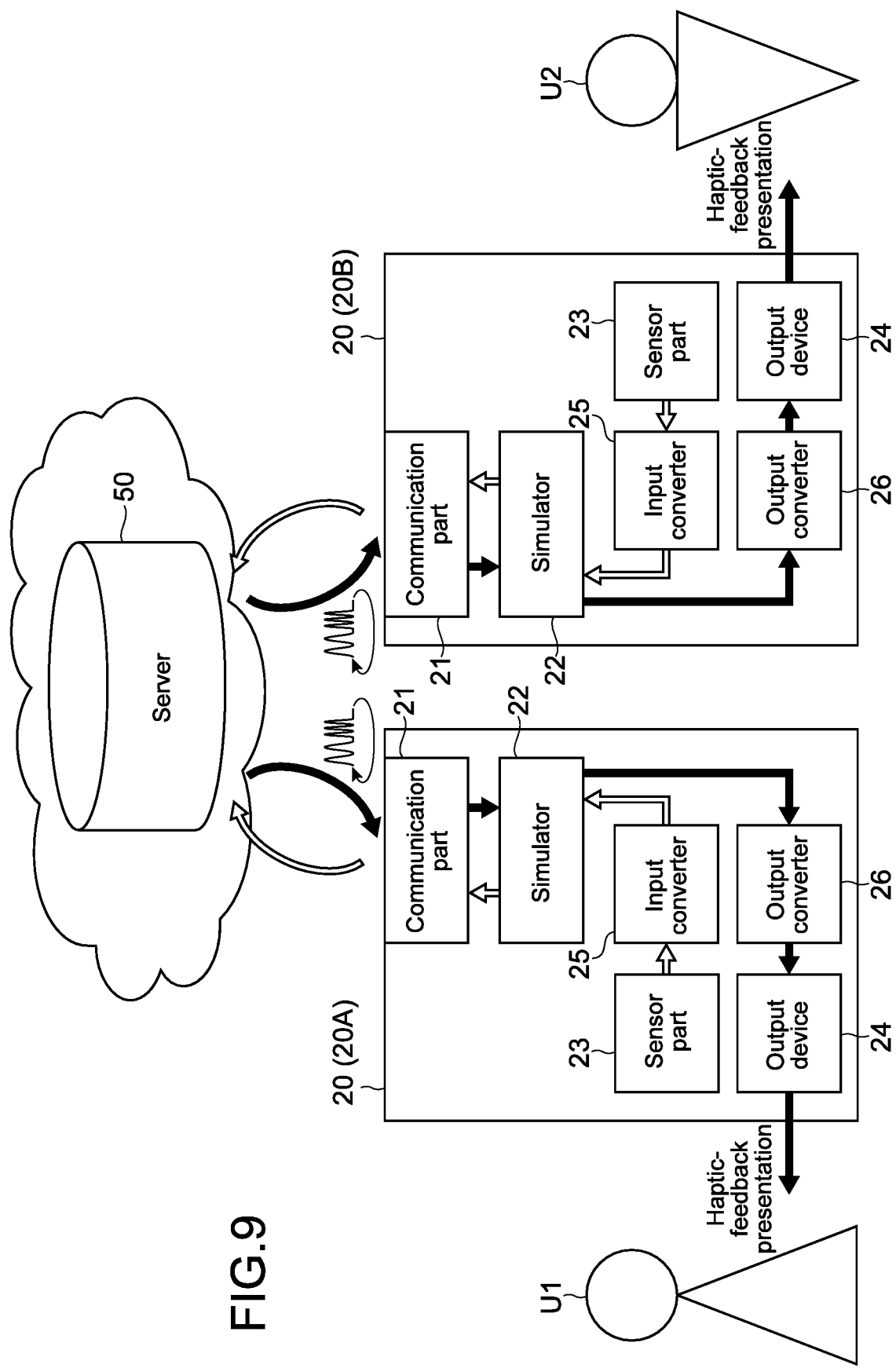
FIG. 9 is a diagram for illustrating an operation when the data are downloaded from the server in the operation example 2-2.
Figure 10:
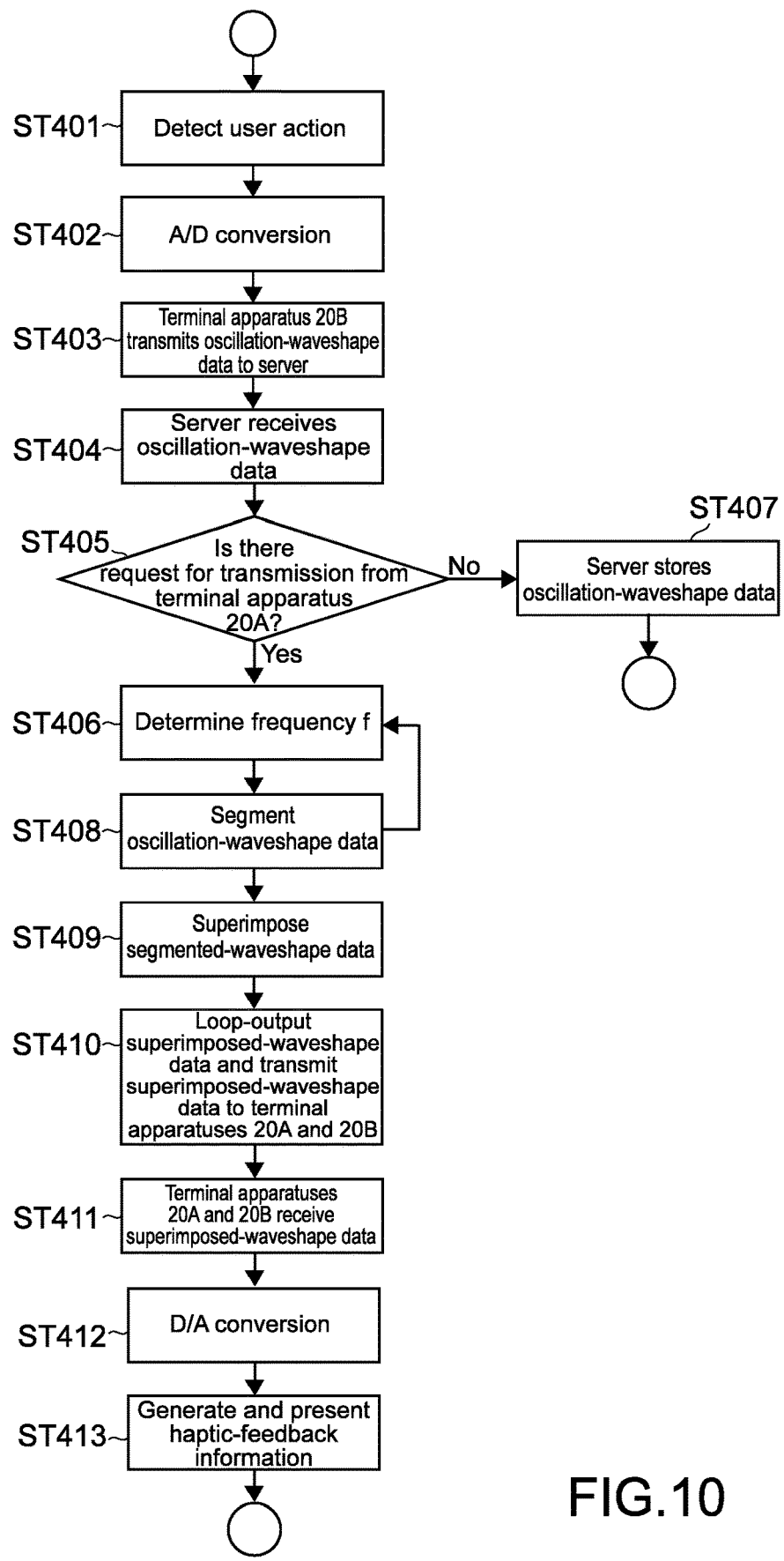
FIG. 10 is a flowchart showing the operation example 2-2.

In an operation example 2-2, for example, as shown in FIG. 8, an example in which the oscillation-waveshape data based on the user actions input by the two users by the simultaneous operations are superimposed on each other will be described. Next, as shown in FIG. 9, an example in which the haptic feedbacks corresponding to the superimposed oscillation-waveshape data are presented to the two users will be described. FIG. 10 is a flowchart showing an operation of the information processing system in this case.

The one user, for example, the user U2 inputs the user action to the terminal apparatus 20B, and then, the similar processing to the steps 101 to 105 (See FIG. 4) is executed (steps 401 to 405).

In the present operation example 2-2, the user U1 inputs the user action by the simultaneous operation, and as a result, the server 50 receives the request for transmission from the terminal apparatus 20A (Yes in step 405). The server 50 also receives, that is, the oscillation-waveshape data from the terminal apparatus 20A. In this case, the operation goes to the step 406. In a case that there is no request for transmission, the operation is the non-simultaneous operation, and the server 50 stores the oscillation-waveshape data in the storage part (step 407).

The processor part of the server 50 executes the similar processing to the steps 303 to 306 shown in the operation example 2-1 (steps 406 and 408 to 410). Here, the superimposed-waveshape data $WB_{(n)t}$, which are generated by superimposing the segmented-waveshape data of the oscillation-waveshape data of the terminal apparatuses 20A and 20B with each other, are expressed by an equation (3) described below. The segmented-waveshape data of the oscillation-waveshape data from the terminal apparatus 20A are referred to as $WX_{(n)t}$. The segmented-waveshape data of the oscillation-waveshape data from the terminal apparatus 20B are referred to as $WY_{(n)t}$. The sampling number of moving average processing is ten.

$$WB_{(n)t}=WB_{(n-1)t}+(WX_{(n)t}+WY_{(n)t}-WX_{(n-10)t}-WY_{(n-10)t})/20 \quad (3)$$

The loop period $TT_{(n)}$ is expressed by an equation (4) described below.

$$TT_{(n)}=TT_{(n-1)}+(TX_{(n)}+TY_{(n)}-TX_{(n-10)}-TY_{(n-10)})/20 \quad (4)$$

For example, in a case that the number of the terminal apparatuses 20 (segmented-waveshape data $WZ_{(n)t}$ of oscillation-waveshape data) is further increased by one to be three, the superimposed-waveshape data $WB_{(n)t}$ of the three segmented-waveshape data and the loop periods $TT_{(n)}$ thereof are expressed by equations (5) and (6) described below, respectively.

$$WB_{(n)t}=WB_{(n-1)t}+(WX_{(n)t}+WY_{(n)t}+WZ_{(n)t}-WX_{(n-10)t}-WY_{(n-10)t}-WZ_{(n-10)t})/30 \quad (5)$$

$$TT_{(n)}=TT_{(n-1)}+(TX_{(n)}+TY_{(n)}+TZ_{(n)}-TX_{(n-10)}-TY_{(n-10)}-TZ_{(n-10)})/30 \quad (6)$$

The server 50 transmits the superimposed-waveshape data to both the terminal apparatus 20A and the terminal apparatus 20B, respectively (step 410). Each of the terminal apparatuses 20A and 20B receives the superimposed-waveshape data, and presents the haptic feedback corresponding to the superimposed-waveshape data to each of the users U1 and U2 in real time (steps 411 to 413).

According to the present operation example 2-2, the users U1 and U2 may share the haptic feedback based on the superimposed-waveshape data with each other in real time, and a shared sense and a sense of unity may be obtained.

3. 2. 3) Operation Example 2-3

In an operation example 2-3, an example of the non-simultaneous operation in a case that the segmented-waveshape data of the oscillation-waveshape data are superimposed on each other will be described. The operation example 2-3 is the operation after the step 407 in the operation example 2-2. Here, a flowchart is not shown.

After the step 407, in the case that the server 50 receives the request for transmission from the terminal apparatus 20A, the steps 406 to 409 are executed. In other words, the server 50 generates the superimposed-waveshape data by superimposing the stored segmented-waveshape data from the terminal apparatus 20B and the segmented-waveshape data from the terminal apparatus 20A based on the user action by the user U1 that are received in the present. The server 50 transmits the superimposed-waveshape data to the terminal apparatus 20A, the terminal apparatus 20A receives the superimposed-waveshape data, and the haptic feedback based on the superimposed-waveshape data is presented to the user U1.

According to the operation example 2-3, although not in real time, the haptic feedback corresponding to the superimposed-waveshape data generated by superimposing the oscillation-waveshape data stored in the server 50 and the oscillation-waveshape data based on the user action by the user U1 in the present on each other may be presented to the user U1.

3. 2. 4) Operation Example 2-4

Figure 11:
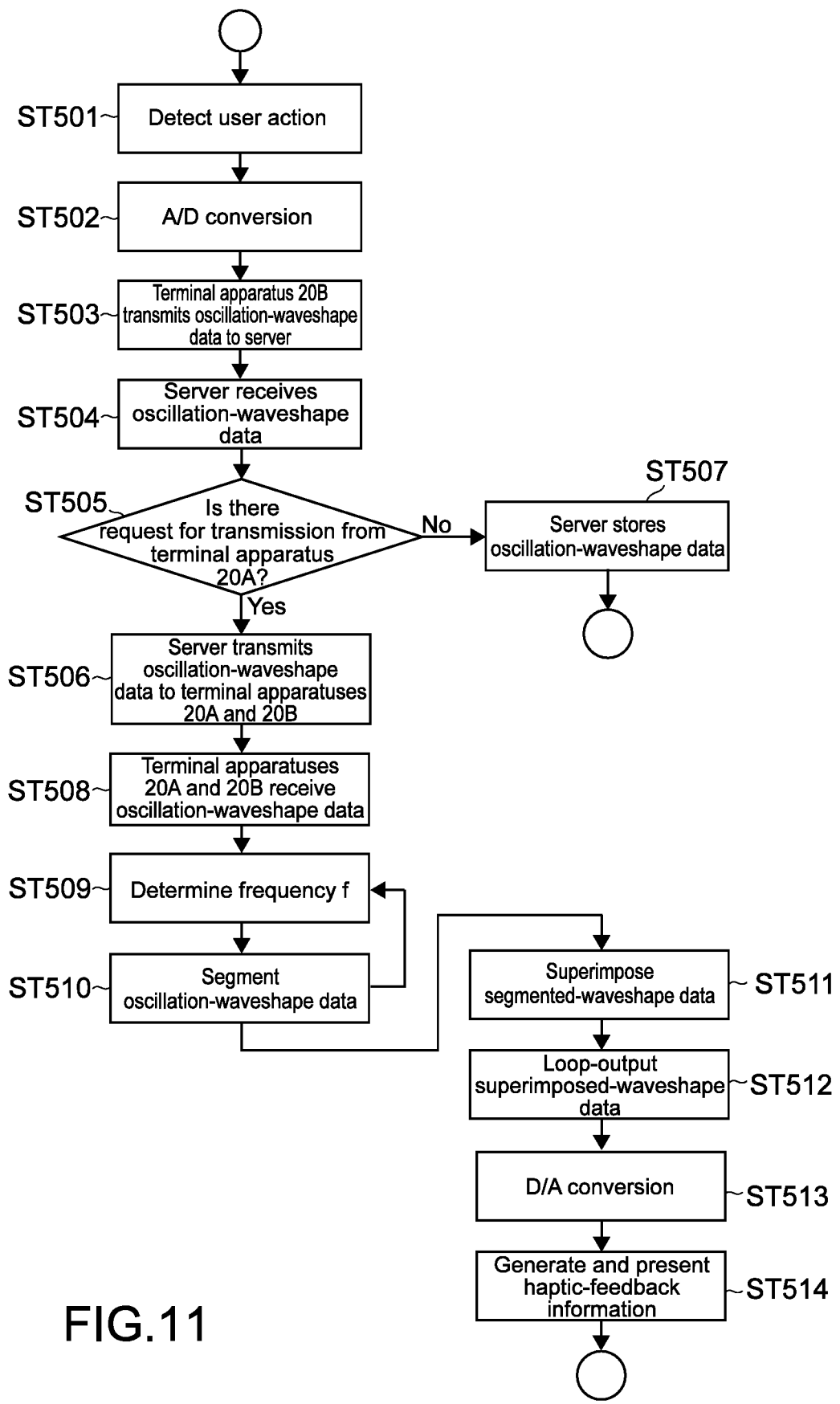
FIG. 11 is a flowchart showing an operation example 2-4 in which segmenting processing and superimposing processing are performed.

In the operation examples 2-2 and 2-3, the server 50 superimposes the two oscillation-waveshape data (segmented-waveshape data) on each other. On the other hand, in an operation example 2-4, an example in which each of the simulators 22 of the terminal apparatuses 20 superimposes the oscillation-waveshape data on each other by the simultaneous operation will be described. FIG. 11 a flowchart showing the operation in the operation example 2-4.

The steps 501 to 505 and 507 are the same processing as the steps 401 to 405 and 407 in the operation example 2-2. In the step 505, in the case that the server 50 receives the request for transmission from the terminal apparatus 20A, the server 50 also receives the oscillation-waveshape data from the terminal apparatus 20A. In this case, the server 50 transmits the oscillation-waveshape data from the terminal apparatus 20B to the terminal apparatus 20A, and transmits the oscillation-waveshape data from the terminal apparatus 20A to the terminal apparatus 20B (step 506).

The terminal apparatuses 20A and 20B receive the oscillation-waveshape data. The simulator 22 of the terminal apparatus 20A generates and superimposes the segmented-waveshape data of the received oscillation-waveshape data from the terminal apparatus 20B and the segmented-waveshape data of the oscillation-waveshape data from the user U1 input to the terminal apparatus 20A in the present on each other (steps 509 to 511). Similarly, the simulator 22 of the terminal apparatus 20B generates and superimposes the segmented-waveshape data of the received oscillation-waveshape data from the terminal apparatus 20A and the segmented-waveshape data of the oscillation-waveshape data from the user U2 input to the terminal apparatus 20B in the present on each other (steps 509 to 511).

The terminal apparatus 20A presents the haptic feedback corresponding to the superimposed-waveshape data to the user U1 (steps 512 to 514), and similarly, the terminal apparatus 20B presents the haptic feedback corresponding to the superimposed-waveshape data to the user U2 (steps 512 to 514).

Note that, an example (operation example 2-5) of the non-simultaneous operation in and after the step 507 is similar to the operation example 2-3 except that the simulator 22 of each of the terminal apparatuses 20A executes the superimposing processing, and the description thereof will be omitted.

4. Application Example of Present Technology

The information processing system according to the present technology that executes the operation example 2 may present, for example, the haptic feedbacks that the two users walk with joining hands with each other to the two users by having the terminal apparatuses 20. In this case, when shake periods of the users are the same, an amplitude of the shake is amplified, and the superimposed-waveshape data are also amplified. As a result, the haptic feedback is also amplified.

The information processing system according to the present technology is applicable to sport watching and live watching. For example, the plurality of users in a venue have the terminal apparatuses 20, and may share the haptic feedback corresponding to the waveshape data when cheering with each other. Due to this, a sense of unity of presence of exaltation between the users may be obtained. Alternatively, in a case that the user having the terminal apparatus 20 watches a sport game or a live concert on the Internet or on TV in a remote region from a scene, the waveshape data generated from the terminal apparatuses 20 of the users in the scene and a venue are transmitted to the terminal apparatus 20 of the user in the region. Due to this, the user in the remote region may share presence of the scene and exaltation of the users in the scene and the venue.

As shown in the operation example 2, this is realizable both in real time and not in real time. In a case that it is not in real time, the user may input the user action, and the haptic feedback may be presented to the user while the user watches a recorded image.

The information processing system according to the present technology is also applicable to education and a lesson. For example, the server 50 or the terminal apparatus 20 stores a model motion of a teacher as the oscillation-waveshape data. A student uses the terminal apparatus 20, and a motion and a rhythm corresponding to the model oscillation-waveshape data may be reproduced by the terminal apparatus 20. Moreover, the student may input the user action depending on the motion and the rhythm. Of course, this is also realizable both in real time and not in real time.

5. Various Other Embodiments

The present technology is not limited to the embodiment described above, and the present technology may realize various other embodiments.

For example, as shown in FIG. 11, the example in which the terminal apparatus 20 generates the superimposed-waveshape data as the "waveshape data" by superimposing the segmented-waveshape data on each other. However, on the basis of the segmented-waveshape data, the terminal apparatus 20 may generate other waveshape data instead of the superimposed-waveshape data. Specifically, the terminal apparatus 20 may generate other waveshape data by changing an amplitude and/or a frequency or the like of the segmented-waveshape data overall or partially, for example. This is also applicable to the server 50.

In the embodiment, the processor part of the server 50 or the simulator 22 generates the segmented-waveshape data at the timings every one period. Alternatively, the processor part of the server 50 or the simulator 22 may be configured to generate the segmented-waveshape data at timings every plurality of periods.

For example, in the operation example 2-2 (and 2-3) shown in FIG. 10, the server 50 executes generation of the segmented-waveshape data and the superimposed-waveshape data. Alternatively, the server 50 may generate and transmit the segmented-waveshape data to the terminal apparatus 20, and the terminal apparatus 20 may generate the superimposed-waveshape data on the basis of the received segmented-waveshape data. Such processing is also applicable to the operation example 2-4 (and 2-5) shown in FIG. 11.

The server 50 may store oscillation-waveshape data (second oscillation-waveshape data) or segmented data thereof as sample data in advance. In this case, the one or more terminal apparatuses 20 may access the sample data, and may reproduce the sample data by the terminal apparatus 20. Alternatively, the one or more terminal apparatuses 20 may be configured to generate superimposed-waveshape data by superimposing the sample data and (segmented-waveshape data of) oscillation-waveshape data based on user actions input to the one or more terminal apparatuses 20.

As the sample data, for example, there are oscillation-waveshape data when a liquid or a marble in a cup moves. For example, the server 50 may provide the sample data and image data when the liquid or the marble in the cup moves to the terminal apparatus 20. The one or plurality of users may overlap oscillation-waveshape data of user actions of the one or plurality of users with the motion of the liquid or the marble in the cup by inputting the user actions to the terminal apparatus 20, and may also amplify the motion. This is not limited to the case that the server 50 provides such image data and oscillation-waveshape data, and the terminal apparatus 20 may hold the image data and the sample data in advance.

The information processing system according to the embodiment includes the server 50, and is configured by a wide area network. However, the information processing system may not include the server 50, and the plurality of terminal apparatuses 20 may be connected to each other by peer-to-peer connection or a local area network. In this case, mainly, the simulator 22 of each of the terminal apparatuses 20 is configured to execute generation of segmented-waveshape data and superimposed-waveshape data.

At least two of the features of the other embodiments or the operation examples described above may also be combined.

Note that the present technology may also employ the following configurations.

(1)

A terminal apparatus, including:

a processor part configured to generate segmented-waveshape data by segmenting oscillation-waveshape data at a timing based on one or a plurality of periods of the oscillation-waveshape data, and to generate waveshape data based on the segmented-waveshape data;

a haptic-feedback-information output part configured to generate and output haptic-feedback information corresponding to the waveshape data generated by the processor part; and a detection part configured to detect an input signal based on a user action, and to output the detected input signal to the processor part as the oscillation-waveshape data.

(2)

The terminal apparatus according to (1), in which the processor part is configured to generate superimposed-waveshape data by superimposing the plurality of segmented-waveshape data of the oscillation-waveshape data corresponding to the input signal detected by the detection part on each other, and the haptic-feedback-information output part is configured to generate and output haptic-feedback information corresponding to the superimposed-waveshape data.

(3)

The terminal apparatus according to (1), further including a communication part configured to transmit and receive the oscillation-waveshape data or the segmented-waveshape data.

(4)

The terminal apparatus according to (3), in which the processor part is configured to generate superimposed-waveshape data by superimposing segmented-waveshape data of first oscillation-waveshape data corresponding to the input signal detected by the detection part and segmented-waveshape data of second oscillation-waveshape data acquired via the communication part on each other, and the haptic-feedback-information output part is configured to generate and output haptic-feedback information corresponding to the superimposed-waveshape data.

(5)

The terminal apparatus according to (4), in which the processor part is configured to generate superimposed-waveshape data by superimposing segmented-waveshape data of second oscillation-waveshape data transmitted from another second terminal apparatus and acquired via the communication part, and segmented-waveshape data of the oscillation-waveshape data on each other.

(6)

The terminal apparatus according to any one of (1) to (5), in which the detection part has a sensing function for starting generation of the haptic-feedback information by the haptic-feedback-information output part, the processor part is configured to execute the segmenting processing on the basis of a value detected by the sensing function, and the haptic-feedback-information output part is configured to generate and output the haptic-feedback information based on the waveshape data.

(7)

The terminal apparatus according to any one of (1) to (5), in which the processor part includes an application program for starting generation of the haptic-feedback information by the haptic-feedback-information output part, the processor part being configured to execute the application program to execute the segmenting processing, and the haptic-feedback-information output part is configured to generate and output the haptic-feedback information based on the waveshape data.

(8)

A server, including:

a communication part; and a processor part configured to generate segmented-waveshape data by segmenting oscillation-waveshape data received by the communication part at a timing based on one or a plurality of periods of the oscillation-waveshape data, in which the processor part is configured to transmit the oscillation-waveshape data or the segmented-waveshape data to a first terminal apparatus via the communication part, according to a request for transmission from the first terminal apparatus received by the communication part.

(9)

The server according to (8), in which in a case that the first terminal apparatus has a function of detecting an input signal based on a user action, and transmitting the detected input signal to the server as first oscillation-waveshape data, the processor part is configured to generate superimposed-waveshape data by superimposing segmented-waveshape data of second oscillation-waveshape data transmitted from another second terminal apparatus different from the first terminal apparatus, and segmented-waveshape data of the first oscillation-waveshape data on each other, and to transmit the superimposed-waveshape data to the first terminal apparatus.

(10)

The server according to (9), in which the processor part is further configured to transmit the superimposed-waveshape data to a second terminal apparatus, according to a request for transmission from the second terminal apparatus received by the communication part.

(11)

An information processing system, including:
a server; and a terminal apparatus, in which
the server includes
a server-side communication part, and
a server-side processor part configured to transmit oscillation-waveshape data by the server-side communication part, according to a request for transmission from the terminal apparatus, and
the terminal apparatus includes
a communication part receiving the oscillation-waveshape data transmitted from the server,
a processor part configured to generate segmented-waveshape data by segmenting oscillation-waveshape data at a timing based on one or a plurality of periods of the received oscillation-waveshape data, and to generate waveshape data based on the segmented-waveshape data,
a haptic-feedback-information output part configured to generate and output haptic-feedback information corresponding to the waveshape data generated by the processor part, and
a detection part configured to detect an input signal based on a user action, and to output the detected input signal to the processor part as the oscillation-waveshape data.

(12)

An information processing system, including:
a server; and a terminal apparatus, in which
the server includes
a server-side communication part, and
a processor part configured, according to a request for transmission from the terminal apparatus received by the communication part, to generate segmented-waveshape data by segmenting oscillation-waveshape data at a timing based on one or a plurality of periods of the oscillation-waveshape data received by the communication part, to generate waveshape data based on the segmented-waveshape data, and to transmit the waveshape data to the terminal apparatus, and
the terminal apparatus includes
a communication part configured to receive the waveshape data, and
a haptic-feedback-information output part configured to generate and output haptic-feedback information corresponding to the waveshape data received by the communication part.

REFERENCE SIGNS LIST 20 (20A, 20B) terminal apparatus
21 communication part
22 simulator
23 sensor part
24 output device
25 input converter
26 output converter
50 server It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A terminal apparatus, comprising:
a processor part configured to generate segmented-waveshape data by segmenting oscillation-waveshape data at a timing based on one or a plurality of periods of the oscillation-waveshape data, and to generate waveshape data based on the segmented-waveshape data;
a haptic-feedback-information output part configured to generate and output haptic-feedback information corresponding to the waveshape data generated by the processor part; and
a detection part configured to detect an input signal based on a user action, and to output the detected input signal to the processor part as the oscillation-waveshape data.

2. The terminal apparatus according to claim 1, wherein the processor part is configured to generate superimposed-waveshape data by superimposing the plurality of segmented-waveshape data of the oscillation-waveshape data corresponding to the input signal detected by the detection part, and
the haptic-feedback-information output part is configured to generate and output haptic-feedback information corresponding to the superimposed-waveshape data.

3. The terminal apparatus according to claim 1, further comprising
a communication part configured to transmit and receive the oscillation-waveshape data or the segmented-waveshape data.

4. The terminal apparatus according to claim 3, wherein the processor part is configured to generate superimposed-waveshape data by superimposing segmented-waveshape data of first oscillation-waveshape data corresponding to the input signal detected by the detection part and segmented-waveshape data of second oscillation-waveshape data acquired via the communication part, and
the haptic-feedback-information output part is configured to generate and output haptic-feedback information corresponding to the superimposed-waveshape data.

5. The terminal apparatus according to claim 4, wherein the processor part is configured to generate superimposed-waveshape data by superimposing segmented-waveshape data of second oscillation-waveshape data transmitted from another second terminal apparatus and acquired via the communication part, and segmented-waveshape data of the oscillation-waveshape data.

6. The terminal apparatus according to claim 1, wherein the detection part has a sensing function for starting generation of the haptic-feedback information by the haptic-feedback-information output part,
the processor part is configured to execute the segmenting processing on a basis of a value detected by the sensing function, and
the haptic-feedback-information output part is configured to generate and output the haptic-feedback information based on the waveshape data.

7. The terminal apparatus according to claim 1, wherein the processor part includes an application program for starting generation of the haptic-feedback information by the haptic-feedback-information output part, the processor part being configured to execute the application program to execute the segmenting processing, and the haptic-feedback-information output part is configured to generate and output the haptic-feedback information based on the waveshape data.

8. An information processing system, comprising:

a server; and a terminal apparatus, wherein the server includes a server-side communication part, and a server-side processor part configured to transmit oscillation-waveshape data by the server-side communication part, according to a request for transmission from the terminal apparatus, and the terminal apparatus includes a communication part receiving the oscillation-waveshape data transmitted from the server, a processor part configured to generate segmented-waveshape data by segmenting oscillation-waveshape data at a timing based on one or a plurality of periods of the received oscillation-waveshape data, and to generate waveshape data based on the segmented-waveshape data, a haptic-feedback-information output part configured to generate and output haptic-feedback information corresponding to the waveshape data generated by the processor part, and a detection part configured to detect an input signal based on a user action, and to output the detected input signal to the processor part as the oscillation-waveshape data.

9. An information processing system, comprising:

a server; and a terminal apparatus, wherein the server includes a server-side communication part, and a processor part configured, according to a request for transmission from the terminal apparatus received by the communication part, to generate segmented-waveshape data by segmenting oscillation-waveshape data at a timing based on one or a plurality of periods of the oscillation-waveshape data received by the communication part, to generate waveshape data based on the segmented-waveshape data, and to transmit the waveshape data to the terminal apparatus, and the terminal apparatus includes a communication part configured to receive the waveshape data, and a haptic-feedback-information output part configured to generate and output haptic-feedback information corresponding to the waveshape data received by the communication part.

\* \* \* \* \*